United States Patent Office 3,504,039
Patented Mar. 31, 1970

3,504,039
ADDUCTS OF NITROGEN DIOXIDE AND 1,1-DI-OXYTETRACHLOROCYCLOPENTADIENES
Richard M. Scribner, Wilmington, Del., assignor to E. I. du Pont de Nemours and Company, Wilmington, Del., a corporation of Delaware
No Drawing. Filed Mar. 24, 1966, Ser. No. 536,989
Int. Cl. C07c *43/30*
U.S. Cl. 260—611        1 Claim

ABSTRACT OF THE DISCLOSURE

Described and claimed are selected dinitro-1,1-dialkoxy- and dinitro - 1,1 - alkylenedioxy - 2,3,4,5 - tetrachlorocyclopentenes, a process for their preparation from the corresponding 1,1-dialkoxy- and 1,1-alkylenedioxy-2,3,4,5-tetrachlorocyclopentadienes and their application as fungicides.

FIELD OF THE INVENTION

This invention relates to substituted tetrachlorocyclopentenes, to their preparation and to the utilization thereof to protect plants.

DETAILS OF THE INVENTION

Specifically, this invention is directed to dinitro-1,1-dialkoxy- and dinitro-1,1-alkylenedioxy-2,3,4,5-tetrachlorocyclopentenes and to their preparation. This invention is also directed to plant protectant compositions and methods for protecting plants from soil fungi, such as *Rhizoctonia* spp., by applying to soil a plant protectant amount of the compounds of this invention. Compounds of this invention are represented by Formula I and are prepared in accordance with the following equation.

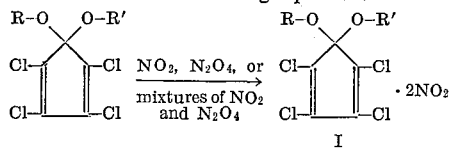

I wherein R and R' taken separatedy can be the same or different and are alkyl groups containing 1-4 carbon atoms and taken together are an alkylene group of 2 carbon atoms. The compounds of this invention are prepared as shown above by the reaction of nitrogen dioxide, dinitrogen tetroxide or a mixture of nitrogen dioxide and dinitrogen tetroxide with 1,1-dialkoxy- and 1,1-alkylenedioxy-2,3,4,5-tetrachlorocyclopentadienes wherein the alkoxy groups contain up to 4 carbon atoms and the alkylenedioxy group contains 2 carbon atoms.

The addition of two nitro groups to the 1,1-di-substituted-2,3,4,5-tetrachlorocyclopentadiene reactant produces a mixture of position isomers and stereoisomers. Position isomers included in the compound embodiment of this invention are: cis and trans 2,3-dinitro-1,1-dialkoxy- and 2,3-dinitro-1,1-alkylenedioxy-2,3,4,5-tetrachlorocyclopentene-4 and cis and trans 2,5-dinitro-1,1-dialkoxy- and 2,5-dinitro-1,1-alkylenedioxy-2,3,4,5-tetrachlorocyclopentene-3 represented by the following structural formulae:

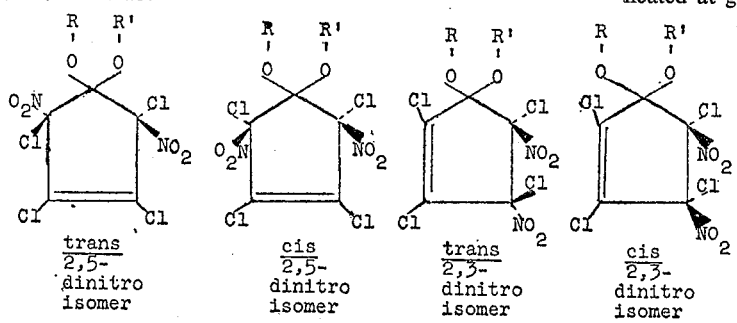

wherein the dotted lines are below and the bold lines are above the plane formed by the cyclopentene ring, and R and R' are defined above.

Trans - 2,5 - dinitro - 2,3,4,5 - tetrachlorocyclopentene-3 is produced as a major constituent by the addition of $NO_2$ or $N_2O_4$ to the tetrachlorocyclopentadiene reactant. The other three isomers generally are produced in lesser varying amounts as shown by Example III.

The preparative process for the compounds of this invention comprises the reaction of nitrogen dioxide, dinitrogen tetroxide or a mixture of nitrogen dioxide and nitrogen tetroxide with 2,3,4,5-tetrachloro-1,1-dioxycyclopentadienes. The cyclopentadiene reactants are produced by reaction of lower alkanols or alkylenediols with hexachlorocyclopentadiene. Alkanols and alkylenediols which can be used in this process include methyl, ethyl, propyl, and butyl alcohols; and ethylene glycol.

Either nitrogen dioxide $(NO_2)$, nitrogen tetroxide $(N_2O_4)$ or a mixture of nitrogen dioxide and dinitrogen tetroxide can be used in the process embodiment of this invention. These two oxides are in equilibrium. This equilibrium is strongly temperature dependent. In the solid state (M.P. $-11.2°$ C.) the oxide is dinitrogen tetroxide, the vapor at 100° C. is 10% $N_2O_4$ and 90% $NO_2$ and the liquid is a solution of $NO_2$ in $N_2O_4$.

Addition of $NO_2$ or $N_2O_4$ to 1,1-dialkoxy or 1,1-alkylenedioxy-2,3,4,5-tetrachloropentadienes takes place at temperatures of between 0 and 100° C. The reaction can be conducted at subatmospheric or superatmospheric pressures; however it is convenient to run the reaction at atmospheric pressure. An inert diluent or solvent such as carbon tetrachloride, chloroform, ether and 1,1,2,2-tetrafluoro-1,2-dichloroethane can be used. Reaction time for addition of $NO_2$ or $N_2O_4$ is from a few minutes to several hours.

The products of this invention are generally stable solids which can be isolated by removal of the reactants and solvents and by crystallization.

EMBODIMENTS OF THE INVENTION

The following examples further illustrate the products and preparative process of this invention. Temperatures in the examples below are in degrees centigrade.

EXAMPLE I

Dinitro-1,1-dimethoxy-2,3,4,5-tetrachlorocyclopentene

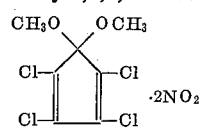

1,1-dimethoxy-2,3,4,5-tetrachlorocyclopentadiene, B.P. 108–111°/11 mm., was prepared by the method of Newcomer and McBee, J. Am. Chem. Soc., 71, 945 (1949). Two grams of this compound were dissolved in 75 ml. of carbon tetrachloride and 4 ml. (at 20°) of dinitrogen tetroxide were added to the solution which was then heated at gentle reflux for five hours under a cold-finger condenser maintained at about −20° C. The solvent was then evaporated in vacuo, giving 3.02 g. of colorless solid which was crystallized from methylene chloride-hexane to afford 0.78 g. of product $C_7H_6N_2O_6Cl_4$; M.P. 125–126°.

$\lambda_{max.}^{EtOH}$ 213 m$\mu$ ($\epsilon$ 19,200), shoulder at about 275 m$\mu$ ($\epsilon$ 100); $\lambda_{max.}^{CCl_4}$ 6.12, 6.29 (strong), 6.91 (weak), 7.51, 8.19, 8.72, 9.04, 9.40, 9.95, 10.8 (weak), $\mu$;

H n.m.r. (CCl$_4$, tetramethylsilane) 6.18$\tau$, single, strong peak.

*Analysis.*—Calc'd for $C_7H_6N_2O_6Cl_4$ (percent): C, 23.6; H, 1.68; N, 7.87; Cl, 40.0. Found (percent): C, 23.9; H, 2.21; N, 7.61; Cl, 39.8.

In an experiment similar to the preceding, a solution of 2.0 g. of 1,1-dimethoxy-2,3,4,5-tetrachlorocyclopentadiene and 4.0 ml. (at 20°) of dinitrogen tetroxide in 75 ml. of carbon tetrachloride was allowed to stand at room temperature for 25 hours and then evaporated in vacuo. The solid residue was crystallized from boiling hexane, affording 1.34 g. of white solid, M.P. 110–116°. Recrystallization from hexane and sublimation at 100°/0.1 mm. gave $C_7H_6N_2O_6Cl_4$; M.P. 114.0°;

$\lambda_{max.}^{EtOH}$ 214 m$\mu$ ($\epsilon$ 16,800), shoulder about 280 m$\mu$ ($\epsilon$ 113). The infrared spectrum of this sample was identical to that of the product prepared above.

*Analysis.*—Found (percent): C, 24.1; H, 2.08; N, 7.54; Cl, 39.4.

EXAMPLE II

Dinitro-1,1-dimethoxy-2,3,4,5-tetrachlorocyclopentene

A solution of 6.0 g. of 1,1-dimethoxy-2,3,4,5-tetrachlorocyclopentadiene and 3.0 ml. (at 20°) of dinitrogen tetroxide in 75 ml. of carbon tetrachloride was allowed to stand at ambient temperature for four day in a stoppered flask and then evaporated to dryness under reduced pressure. Trituration of the residual yellow oil with petroleum ether gave 5.7 g. of a white crystalline solid, M.P. 108–113°, having an infrared spectrum identical to that of the product of the reaction described above. A solution of 1.0 g. portion of this sample in ether was washed twice with 5% hydrochloric acid, once with water, and twice with 5% sodium bicarbonate solution. Evaporation of the dried ethereal solution gave 0.906 g. of solid, M.P. 108–111°, after crystallization from hexane. The infrared spectrum of this product was identical to that observed for the product of the reaction described in Example I.

EXAMPLE III

Dinitro-1,1-dimethoxy-2,3,4,5-tetrachlorocyclopentene

To a solution of 40 g. of 1,1-dimethoxy-2,3,4,5-tetrachlorocyclopentadiene in 225 ml. of carbon tetrachloride at 0° was added with stirring a solution of 15 ml. (20.5 g.) of dinitrogen tetroxide in 20 ml. of carbon tetrachloride. The mixture was stirred at 0° for about 2 hours and then at room temperature for four days. Evaporation of the reaction mixture under reduced pressure at 35° gave 55 g. of yellow oil which was dissolved in 50 ml. of petroleum ether and cooled in an ice bath for 30 minutes. This gave 32 g. (59% yield) of a white crystalline solid, which by n.m.r. spectroscopy (in carbon tetrachloride, tetramethylsilane internal standard) was shown to be a mixture of two isomeric dinitro-1,1-dimethoxy-2,3,4,5-tetrachlorocyclopentenes. The major component of the mixture (about 75%) exhibited a peak at 3.82 p.p.m. (6.18$\tau$) and was therefore identical to the single isomer described in Example I. On the basis of its single peak this component was identified as trans - 2,5 - dinitro-1,1-dimethoxy - 2,3,4,5 - tetrachlorocyclopent-3-ene. A second component of this mixture of isomers exhibited two peaks of equal intensity at 3.88 and 3.41 p.p.m. The n.m.r. spectrum of the oily filtrate remaining after collection of the mixture of solids possessed seven major peaks, at 3.92, 3.88, 3.82, 3.60, 3.56, 3.50 and 3.41 p.p.m. The positions and relative intensities of these peaks indicate that the major component of the mixture was trans-2,5-dinitro-1,1-dimethoxy - 2,3,4,5 - tetrachlorocyclopent-3-ene, accompanied by smaller amounts of cis - 2,5 - dinitro-1,1-dimethoxy - 2,3,4,5 - tetrachlorocyclopent - 3 - ene, trans-2,3 - dinitro - 1,1 - dimethoxy - 2,3,4,5 - tetrachlorocyclopent - 4 - ene, and cis-2,3-dinitro-1,1-dimethoxy-2,3,4,5-tetrachlorocyclopent-4-ene.

EXAMPLE IV

Dinitro-1,1-ethylenedioxy-2,3,4,5-tetrachlorocyclopentene

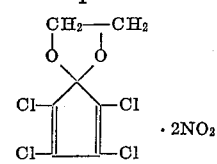

A solution of 1.0 g. of 1,1-ethylenedioxy-2,3,4,5-tetrachlorocyclopentadiene (prepared by the method of Chang, J. Chem. Soc., 1965, 2305) and 1.0 ml. (at 20°) of dinitrogen tetroxide in 25 ml. of carbon tetrachloride was allowed to stand for two days at room temperature. Evaporation of the reaction mixture under reduced pressure and addition of petroleum ether to the residue gave 0.51 g. of a product, M.P. 107–108°, after crystallization from hexane. An analytical sample, prepared by sublimation at 90°/0.1 mm., had M.P. 107–109°, $\lambda_{max}^{CCl_4}$ 6.19 (strong), 6.30 (strong), 6.76 (weak), 6.81, (weak), 7.55 (strong), 8.18 (strong), 8.45 doublet, 9.80, 10.60 $\mu$.

*Analysis.*—Calc'd for $C_7H_4N_2O_6Cl_4$ (percent): C, 23.9; H, 1.14; Cl, 40.1. Found (percent): C, 24.1; H, 1.46; Cl, 40.1.

EXAMPLE V

Dinitro-1,1-α-diethoxy-2,3,4,5-tetrachlorocyclopentene

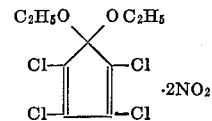

A solution of 1.0 of 1,1-diethoxy-2,3,4,5-tetrachlorocyclopentadiene [(prepared by the method of Newcomer and McBee (loc. cit.))] and 1.0 ml. (at 20°) of dinitrogen tetroxide in 25 ml. of carobn tetrachloride was allowed to stand at room temperature for two days and then evaporated under reduced pressure. The residue on trituration with petroleum ether gave 0.42 g. of a product which on crystallization from hexane melted at 67–74°; sublimation at 60°/0.1 mm., gave white crystals, M.P. 85.0–86.0° (sealed capillary).

*Analysis.*—Calcd. for $C_9H_{10}Cl_4N_2O_6$ (percent): C, 28.2; H, 2.62; Cl, 37.0; N, 7.29. Found (percent): C, 28.3; H, 2.82; Cl, 37.2; N, 7.25.

In addition to the specifically disclosed dinitro compounds above, dinitro derivatives of 1,1,di-n-butoxy-2,3,4,5-tetrachlorocyclopentadiene,
1,1-diisopropoxy-2,3,4,5-tetrachlorocyclopentadiene,
1,1-di-n-propoxy-2,3,4,5-tetrachlorocyclopentadiene,
1,1-trimethylenedioxy-2,3,4,5-tetrachlorocyclopentadiene, and
1,1-(ethylenedioxy)-2,3,4,5-tetrachlorocyclopentadiene can be prepared by the same general procedure.

The compounds of this invention possess plant protective activity against *Rhizoctonia* spp.

*Rhizoctonia* spp. are a common soil fungi. The species *Rhizoctonia solani*, for example, attacks many valuable plants including: (1) field crops such as alfalfa, cotton, peanuts, sugare beets, sugar cane and soybean; (2) ornamentals and house plants such as aster, begonia, camellia, carnation, chrysanthemum, dahlia, geranium, lily and orchid; (3) cereals and grasses such as barley, bent grass, rye, St. Augustine, oats and wheat; and (4) truck crops such as beans, beets, cucumbers, eggplant, lettuce, onions, potatoes and tomatoes.

*Rhizoctonia solani* makes its appearance in plants in several forms. For example, it appears as root rot and blight in soybean, as "sore-shin" in cotton, and causes foliage blight, crown rot and root canker in alfalfa. (Other species of *Rhizoctonia* attacking plants include *Rhizoctonia zeae, Rhizoctonia corcorum, Rhizoctonia butaticola, Rhizoctonia ramicola* and *Rhizoctonia tuliparium*.)

In general, plant protectant compositions containing compouds of this invention contain one or more surface active agents. Surfactants can be present in compositions in the range of 0.1 to 20% with 0.2–10% by weight preferred. Active surfactants useful in the plant protectant compositions are disclosed in U.S. Patents 2,412,510; 2,426,417 and 2,655,447.

Free flowing inert powders can be added to the active compounds as diluents. The resultant compositions can be used as dusts or as wettable powders using methods known in the art.

Compositions of this invention can contain common liquid solvents such as alcohols, ketones, hydrocarbons, chlorinated hydrocarbons and amides. Formulations can be made either in low amounts or high amounts with or without added emulsifying agents.

The method of application of compounds or the above compositions containing the compounds can be varied. Application can be made to soil before or after planting or application can be made to growing plants. Rate of application will vary and will generally be in excess of the amount necessary to control the fungus such as *Rhizoctonia solani*. Mixtures of pesticides including the above compounds can be made and applied to protect plants from a spectrum of pests including soil fungi. Generally, the compounds of this invention are applied to soils in amounts ranging from 0.05 pound per acre or less to 20 pounds per acre. More can of course be used, but as the percent control cannot exceed 100, such rates are considered unnecessary.

The following example illustrates the method of protecting plants.

EXAMPLE VI

The product of each of the examples was dissolved in acetone and applied to soil inoculated with *Rhizoctonia solani*. The compound was mixed to a depth of about two inches and cotton seeds planted. Germination was checked after a week. Compounds of Examples I and II gave 100% control of the fungus at a rate of 4.0 lb./acre and 70% control at 2.0 lb./acre. The compound of Example III gave 100% control at 10.0 lb./acre, based on the germination of the seeds. No phytoxicity was observed.

The foregoing detailed description has been given for clarity of understanding only and no unnecessary limitations are to be understood therefrom. The invention is not limited to the exact details shown and described for obvious modifications will be apparent to those skilled in the art.

The embodiments of the invention in which an exclusive property or privilege is claimed are defined as follows:

1. A compound of the formula selected from the group consisting of

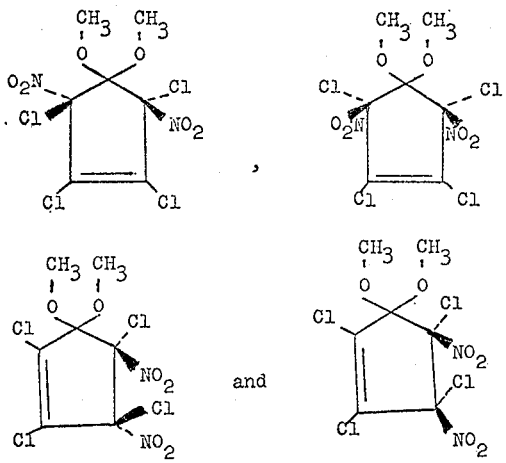

References Cited
UNITED STATES PATENTS
2,697,103  12/1954  Ordas _____ 260—611 XR
3,358,039  12/1967  Chang _____ 260—611

BERNARD HELFIN, Primary Examiner

U.S. Cl. X.R.

71—3; 260—338, 340.7, 340.9, 999